US011842054B2

(12) United States Patent
Jean

(10) Patent No.: US 11,842,054 B2
(45) Date of Patent: *Dec. 12, 2023

(54) PRIORITIZED SECURITY

(71) Applicant: Micron Technology, Inc., Boise, ID (US)

(72) Inventor: Sebastien Andre Jean, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/558,224

(22) Filed: Dec. 21, 2021

(65) Prior Publication Data

US 2022/0113880 A1 Apr. 14, 2022

Related U.S. Application Data

(63) Continuation of application No. 16/806,720, filed on Mar. 2, 2020, now Pat. No. 11,216,193, which is a
(Continued)

(51) Int. Cl.
*G06F 21/00* (2013.01)
*G06F 3/06* (2006.01)
(Continued)

(52) U.S. Cl.
CPC .......... *G06F 3/0623* (2013.01); *G06F 3/0608* (2013.01); *G06F 3/0652* (2013.01);
(Continued)

(58) Field of Classification Search
CPC .... G06F 3/0623; G06F 3/0659; G06F 3/0679; G06F 3/0608; G06F 12/0246;
(Continued)

(56) References Cited

U.S. PATENT DOCUMENTS 8,521,930 B1 * 8/2013 Meyers ............... G06F 13/4221
710/220
8,886,911 B2 11/2014 Nemazie et al.
(Continued)

FOREIGN PATENT DOCUMENTS

CN 105074673 A 11/2015
CN 111108499 A 5/2020
(Continued)

OTHER PUBLICATIONS

"Chinese Application Serial No. 201880060048.8, Office Action dated Aug. 14, 2020", w/ English translation & machine translation, 34 pgs.
(Continued)

*Primary Examiner* — Mahfuzur Rahman
(74) *Attorney, Agent, or Firm* — Schwegman Lundberg & Woessner, P.A.

(57) ABSTRACT

Disclosed in some examples are systems, methods, memory devices, and machine readable mediums for a fast secure data destruction for NAND memory devices that renders data in a memory cell unreadable. Instead of going through all the erase phases, the memory device may remove sensitive data by performing only the pre-programming phase of the erase process. Thus, the NAND doesn't perform the second and third phases of the erase process. This is much faster and results in data that cannot be reconstructed. In some examples, because the erase pulse is not actually applied and because this is simply a programming operation, data may be rendered unreadable at a per-page level rather than a per-block level as in traditional erases.

20 Claims, 10 Drawing Sheets

Related U.S. Application Data continuation of application No. 15/692,299, filed on Aug. 31, 2017, now Pat. No. 10,579,288.

(51) Int. Cl.
*G06F 12/02* (2006.01)
*G06F 21/79* (2013.01)

(52) U.S. Cl.
CPC .......... *G06F 3/0659* (2013.01); *G06F 3/0679* (2013.01); *G06F 12/0246* (2013.01); *G06F 21/79* (2013.01); *G06F 2212/1052* (2013.01); *G06F 2221/2143* (2013.01)

(58) Field of Classification Search
CPC ............... G06F 3/0652; G06F 21/79; G06F 2221/2143; G06F 2212/1052
See application file for complete search history.

(56) References Cited

U.S. PATENT DOCUMENTS

| | | | | |
|---|---|---|---|---|
| 8,909,888 | B2* | 12/2014 | Goss | G06F 12/0253 |
| | | | | 711/166 |
| 9,053,008 | B1 | 6/2015 | Horn et al. | |
| 9,229,854 | B1* | 1/2016 | Kuzmin | G06F 11/1072 |
| 9,733,836 | B1 | 8/2017 | Garg et al. | |
| 10,228,858 | B1 | 3/2019 | Stoakes et al. | |
| 10,445,229 | B1* | 10/2019 | Kuzmin | G06F 3/0659 |
| 10,552,085 | B1* | 2/2020 | Chen | G06F 3/0647 |
| 10,579,288 | B2 | 3/2020 | Jean | |
| 2006/0117393 | A1 | 6/2006 | Merry, Jr. et al. | |
| 2008/0059692 | A1 | 3/2008 | Erez | |
| 2009/0204749 | A1 | 8/2009 | Salessi et al. | |
| 2010/0095049 | A1 | 4/2010 | Manning | |
| 2010/0122016 | A1 | 5/2010 | Marotta et al. | |
| 2010/0199041 | A1* | 8/2010 | Schnapp | G06F 3/0665 |
| | | | | 711/114 |
| 2011/0320690 | A1 | 12/2011 | Petersen et al. | |
| 2012/0224425 | A1 | 9/2012 | Fai et al. | |
| 2012/0278529 | A1* | 11/2012 | Hars | G06F 12/0246 |
| | | | | 711/E12.008 |
| 2012/0278564 | A1 | 11/2012 | Goss et al. | |
| 2012/0300554 | A1 | 11/2012 | Goss et al. | |
| 2013/0060981 | A1 | 3/2013 | Horn et al. | |
| 2013/0275835 | A1* | 10/2013 | Aswadhati | G06F 12/0246 |
| | | | | 714/773 |
| 2014/0059406 | A1 | 2/2014 | Hyun et al. | |
| 2014/0181432 | A1 | 6/2014 | Horn | |
| 2015/0032939 | A1 | 1/2015 | Gao et al. | |
| 2015/0052292 | A1 | 2/2015 | Mylly | |
| 2017/0075590 | A1 | 3/2017 | Espeseth et al. | |
| 2017/0075591 | A1 | 3/2017 | Espeseth et al. | |
| 2019/0065085 | A1 | 2/2019 | Jean | |
| 2020/0201551 | A1 | 6/2020 | Jean | |

FOREIGN PATENT DOCUMENTS

| | | |
|---|---|---|
| WO | WO-2016153605 A1 | 9/2016 |
| WO | WO-2019046038 A1 | 3/2019 |

OTHER PUBLICATIONS

"Chinese Application Serial No. 201880060048.8, Response filed Feb. 9, 2-21 to Office Action dated Aug. 14, 2020", w/ English Claims, 21 pgs.

"International Application Serial No. PCT/US2018/047203, International Preliminary Report on Patentability dated Mar. 12, 2020", 9 pgs.

"International Application Serial No. PCT/US2018/047203, International Search Report dated Dec. 14, 2018", 3 pgs.

"International Application Serial No. PCT/US2018/047203, Written Opinion dated Dec. 14, 2018", 7 pgs.

Gasior, Geoff, "Micron's M600 SSD acceletrates writes with dynamic SLC cache", Micron—The Tech Report, [Online]. Retrieved from the Internet: <URL: techreport.com/news/27056/micron-m600-ssd-accelerates-writes-with-dynamic-slc-cache>, (Jul. 26, 2017), 3 pgs.

Glen, Dave, "Optimized Client Computing With Dynamic Write Acceleration", Micron, (2014), 5 pgs.

Lee, Sungjin, et al., "FlexFS: A Flexible Flash File System for MLC NAND Flash Memory", Seoul National University, Korea Samsung Electronics, Korea, (Jun. 2009), 14 pgs.

* cited by examiner

PRIORITIZED SECURITY

PRIORITY APPLICATION

This application is a continuation of U.S. application Ser. No. 16/806,720, filed Mar. 2, 2020, which is a continuation of U.S. application Ser. No. 15/692,299, filed Aug. 31, 2017, now issued as U.S. Pat. No. 10,579,288, all of which are incorporated herein by reference in their entirety.

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line).

In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storages cells of the string. In the example of a vertical string, the polysilicon structure may be in the form of a vertically extending pillar. In some examples the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Disclosed in some examples are methods, systems, memory devices, and machine readable mediums which provide for a method to specify a priority for data purges from NAND devices. A purge command garbage collects and then erases permanently all pages marked as "invalid." Pages marked invalid are pages that were previously used and have not yet been erased. The priority specifies pages which are to be purged before other pages to increase the probability that they are purged given a fixed time budget with which to complete the purge.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touchscreen, keyboard, one or more buttons, etc.), a graphics processing unit (GPU), a power management circuit, a baseband processor or one or more transceiver circuits, etc.

Figure 1:
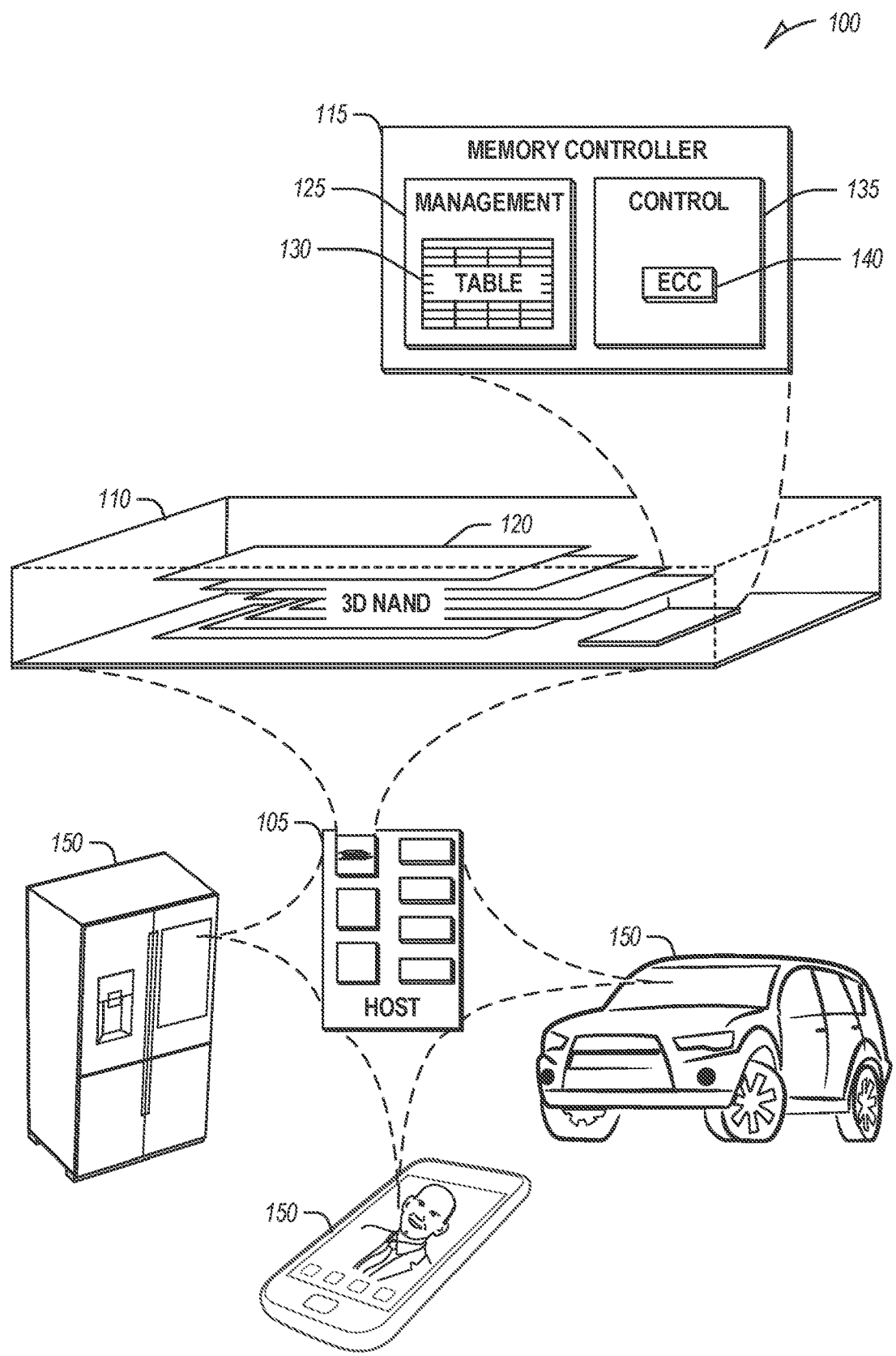
FIG. 1 illustrates an example of an environment including a memory device.

FIG. 1 illustrates an example of an environment 100 including a host device 105 and a memory device 110 configured to communicate over a communication interface (a host interface). The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 may be a machine having some portion, or all, of the components discussed in reference to the machine 1000 of FIG. 10.

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110. The memory controller 115 can include one or more input/output (I/O) circuits, lines, or interfaces to transfer data to or from the memory array 120.

The memory controller 115 can include a memory manager 125 and an array controller 135.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of nonvolatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
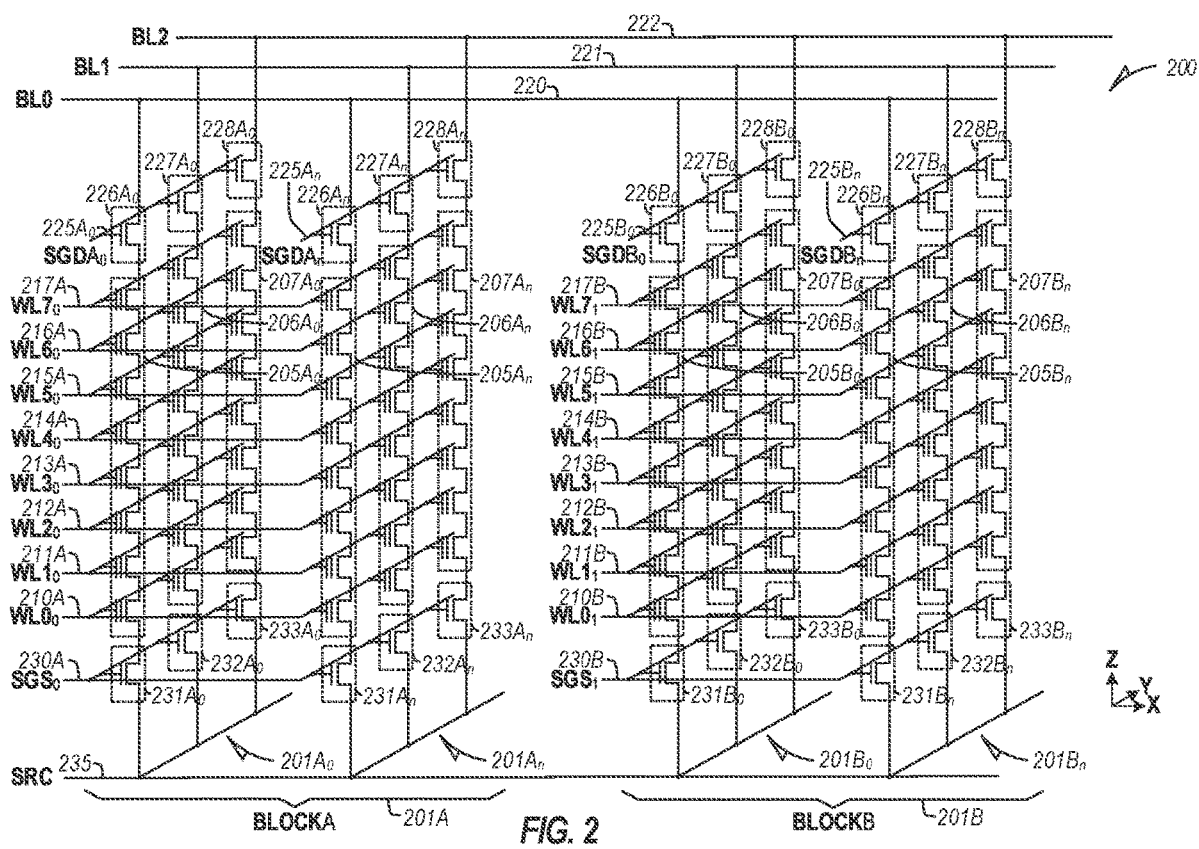
FIGS. 2-3 illustrate schematic diagrams of an example of a 3D NAND architecture semiconductor memory array.

FIG. 2 illustrates an example schematic diagram of a 3D NAND architecture semiconductor memory array 200 including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $A_n$ $B_n$ memory strings $205B_n$-$207B_n$, etc.), organized in blocks (e.g., block A 201A, block B 201B, etc.) and sub-blocks (e.g., sub-block $A_0$ $201A_0$, sub-block $A_n$ $201A_n$, sub-block $B_0$ $201B_0$, sub-block $B_n$ $201B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-

228$B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384 +2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$ can be accessed using an $A_n$ SGD line $SGDA_n$ $225A_n$, first-third $B_0$ SGD $226B_0$-$228B_0$ can be accessed using an $B_0$ SGD line $SGDB_0$ 225 $B_0$, and first-third $B_n$ SGD $226B_n$-$228B_n$ can be accessed using an $B_n$ SGD line $SGDB_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
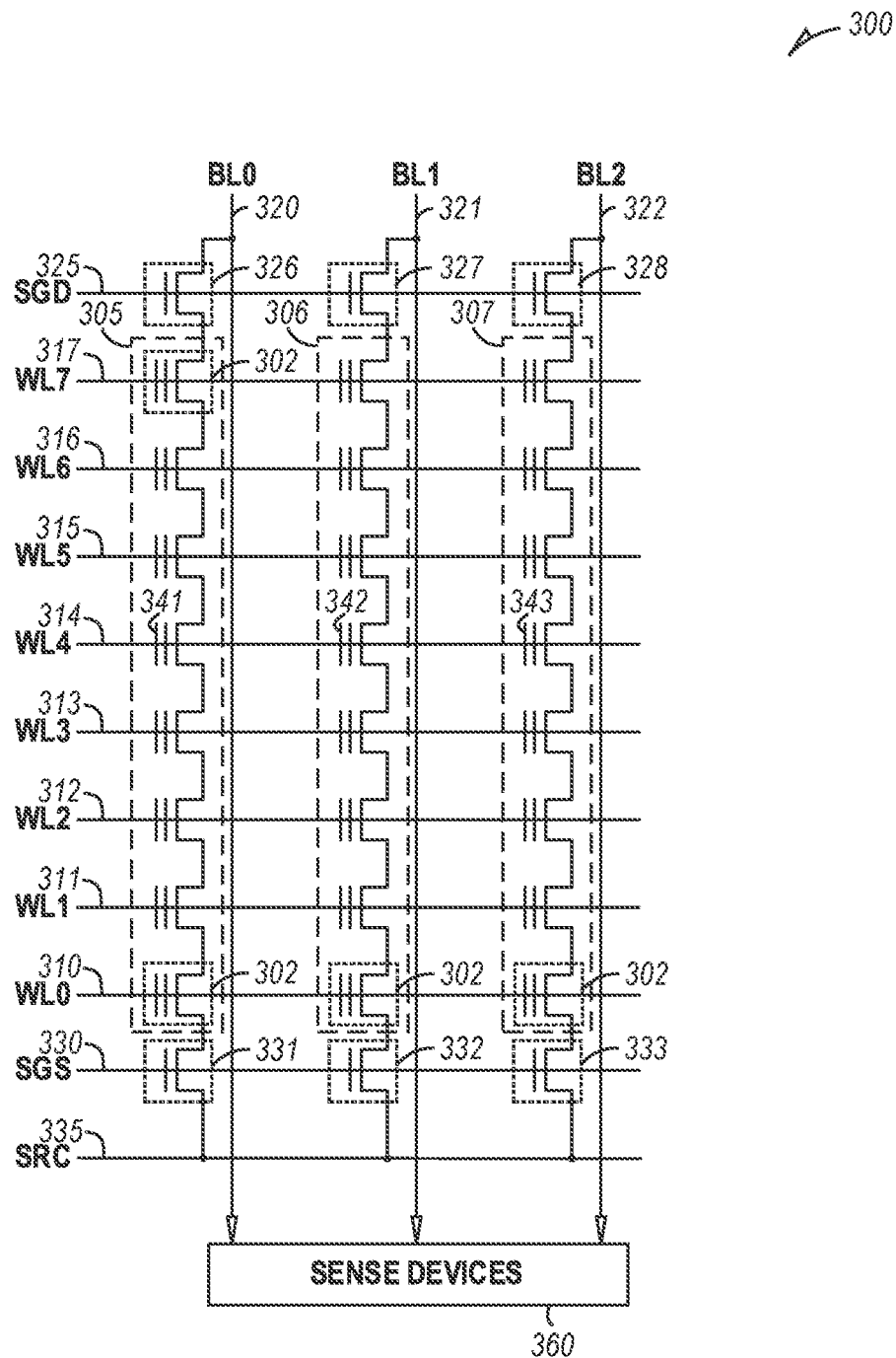

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
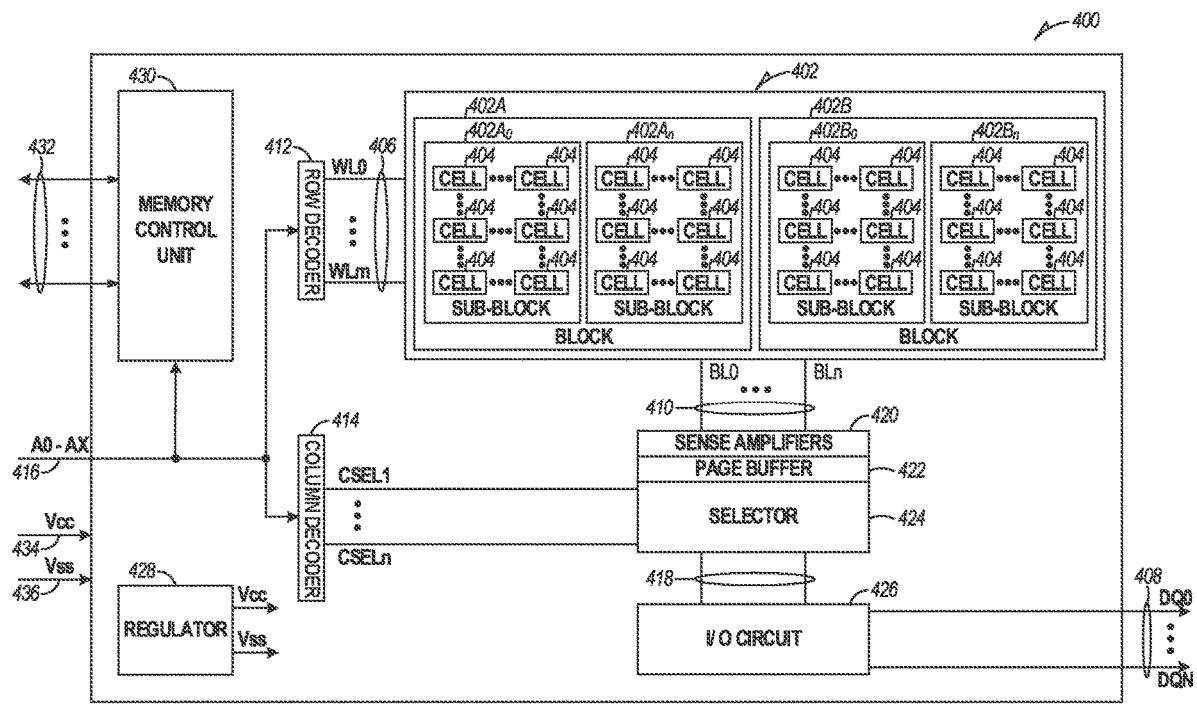
FIG. 4 illustrates an example block diagram of a memory module.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Host software wishing to read, write, or erase data to the memory device issues a command with a one or more logical block addresses (LBAs) specifying one or more memory locations (e.g., memory pages) for the read, write, or erase. In contrast to magnetic storage, in NAND devices, these do not correspond to actual physical locations in the memory devices. Instead, these LBAs are mapped by the NAND to one or more physical pages of NAND memory cells. The reason for this mapping is that the NAND cannot modify a value in the NAND—it must erase the value and then write the new value. Complicating this is that the NAND can only erase a block of memory (which has many pages) at a time. If the delete or modify request is for less than a block of memory, in order to fulfill this request and to preserve the data that is not supposed to be erased, the NAND would have to move all the valid pages to another block and then erase the old block (termed garbage collection). This solution is slow, and also reduces NAND life as a NAND memory cell only has a limited number of program and erase cycles before it is no longer able to hold a charge.

As a result, when receiving a delete request or receiving a request to modify a value in memory, the NAND simply marks the old location as invalid and in the case of a modification, writes the new value to a new physical location (one or more pages) on the memory device. For modification requests, the NAND then updates its mapping of the LBA to the new physical location so that subsequent requests involving that LBA point to the correct physical location.

Eventually the NAND frees up the previously marked invalid pages to maintain the desired level of storage. As previously noted, the NAND only erases blocks of data at a time. As a result of this, the NAND device first does garbage collection which copies the data in valid pages of a block that is to be erased into new pages of other blocks. Once the data is copied, the pages of the block to be erased are marked as invalid and the block may be erased.

As can be appreciated, despite the host's command to delete the data, the data may not actually be deleted for an indeterminate time. Compounding this problem is the fact that each time the data is modified, the modified value is written into a separate page. Thus, the NAND may have a trail of pages with a revision history of previous values of the data. This data may be accessible to highly sophisticated individuals with access to specialized forensic tools. This may pose an unacceptable security risk for some users and some applications.

The NAND devices support a purge command that may be issued by a host system that forces the NAND device to garbage collect and delete all data marked as invalid. Once the purge command is complete the memory locations garbage collected and deleted may be rewritten with new data (e.g., the purge is non-destructive). If there are a lot of invalid blocks, this command may take a long time to complete—longer than users are typically willing to wait. In the case of original equipment manufacturers (OEMs) of user equipment that incorporates the NAND, they may set an upper bound on the amount of time that the purge is allowed to take. The NAND terminates garbage collection and erasure once the time expires. This leaves some pages erased and other pages unerased. This best-effort approach leaves data security to random chance. That is, un-erased sensitive data may or may not be erased depending on how far along the NAND got in purging the memory cells.

Disclosed in some examples are methods, systems, memory devices, and machine readable mediums which provide for a method to specify pages that are to be given priority during NAND purges and also a time limit for completing the purge. The time limit specifies a maximum amount of time the NAND device is allowed to spend on the purge command. In some examples, the NAND device starts the purge by purging the pages that are to be given priority. Once those pages are purged, if there is time remaining, the other pages may be purged. In some examples, multiple priority levels may be defined. In these examples, the NAND device may first purge the highest priority pages, then the next highest priority pages, and so on until the time expires or the purge is complete (whichever event comes first). This priority system ensures that the highest priority data is destroyed. For example NAND pages storing passwords, sensitive cryptographic keys, or the like may be prioritized for purging prior to pages storing less sensitive information such as debug files, readme text files, and the like.

The priority can be expressed as a list of Logical Block Addresses supplied by the host. The memory device may then prioritize purging any un-erased physical pages where that LBA was stored throughout its history. In some examples, there may be a single priority level—either the LBA is prioritized or it is not. In other examples, there may be multiple priority levels. That is, a first priority level that is to be purged first, a second priority level that is to be purged after all the pages that are given a first priority level have been successfully purged, a third priority level, and so on. For example, the host may supply a first set of LBAs that are to be given the first priority level, a second set of LBAs that are to be given the second priority level, and so on. The NAND memory device starts purging the pages corresponding to the LBAs that were given the first priority level and once those are purged moves onto purging pages corresponding to the LBAs that were given the second priority level, and so on until the time limit is reached—at which point processing stops.

The priority of an LBA may be specified by the host when issuing the purge command, or may be specified earlier through a flag in a write or delete command. In still other examples, the priority may be established by a separate command (e.g., a set priority command). In some examples, the priority may be hardcoded into the firmware of the NAND. In some examples, the time limit of the purge may be given in the purge command, a different command (e.g., a command to set the purge time limit value), hardcoded into the firmware of the NAND, and the like.

Figure 5:
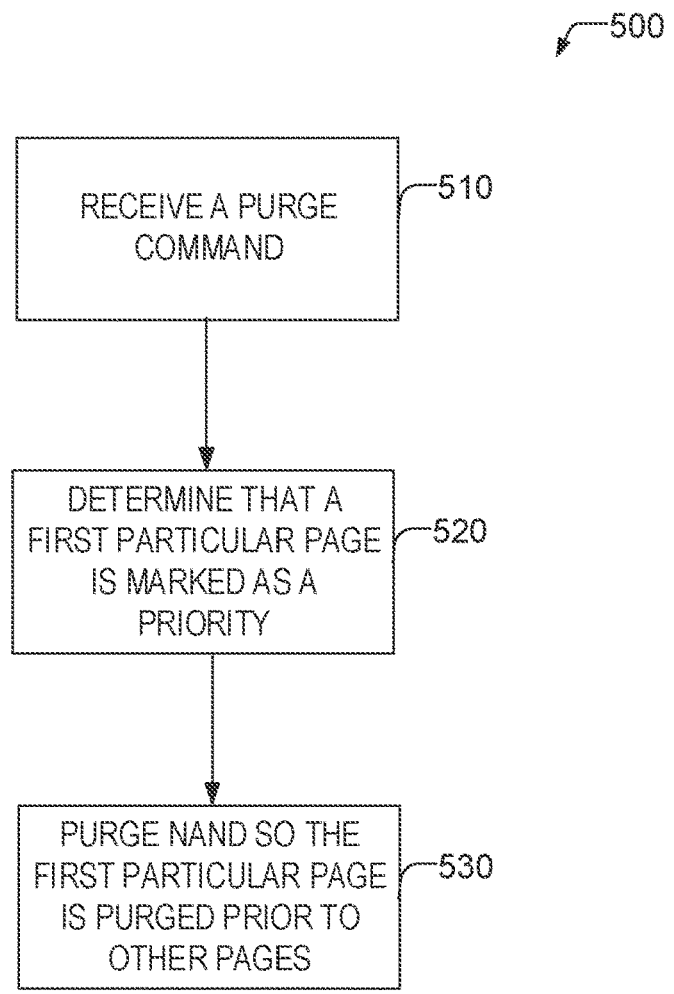
FIG. 5 illustrates a flowchart of a method of purging a NAND device with prioritized pages according to some examples of the present disclosure.

FIG. 5 illustrates a flowchart of a method 500 of purging a NAND device with prioritized pages according to some examples of the present disclosure. At operation 510 the NAND memory device may receive a purge command. For example, the purge command may be received over an interface such as a UFS interface from a host device.

At operation 520 the NAND memory device may determine that a first particular page of the NAND is marked as a priority. For example, the purge command received in operation 510 may specify a list of one or more LBAs that are to be prioritized. In other examples, when the host writes data to an LBA it may indicate a purge priority. In still other examples, the host may utilize a separate command to specify a purge priority.

The NAND may determine the first particular page based upon the one or more LBAs. For example, the first particular page may be selected from a set of one or more pages that correspond to a particular LBA. This set of pages is then assigned the priority level given the LBA. In the case that the LBA still contains valid data, the pages that correspond to that LBA for purposes of the priority purge comprise un-erased pages that are no longer the physical page mapped to the LBA, but had been the physical page mapped to the LBA in the past. In the case that the LBA does not contain valid data (e.g., the host issued a delete command for it), the pages that correspond to that LBA for purposes of the priority purge comprise un-erased pages that are currently mapped to the LBA, and unerased pages no longer mapped to the LBA, but that had been mapped to the LBA in the past.

At operation 530, the NAND memory device may purge the NAND so that the first particular page is purged prior to other pages of lower priority. For example, pages with a first priority may be purged prior to pages of a second priority, and pages with a second priority may be purged prior to pages of a third priority and the like. The system may purge the pages by garbage collecting the set of pages and the erasing them. The system may employ best efforts in order of their priority to erase as many pages as possible before the time expires. Thus, a page with a higher priority is more likely to be deleted than a page of lower priority.

Figure 6:
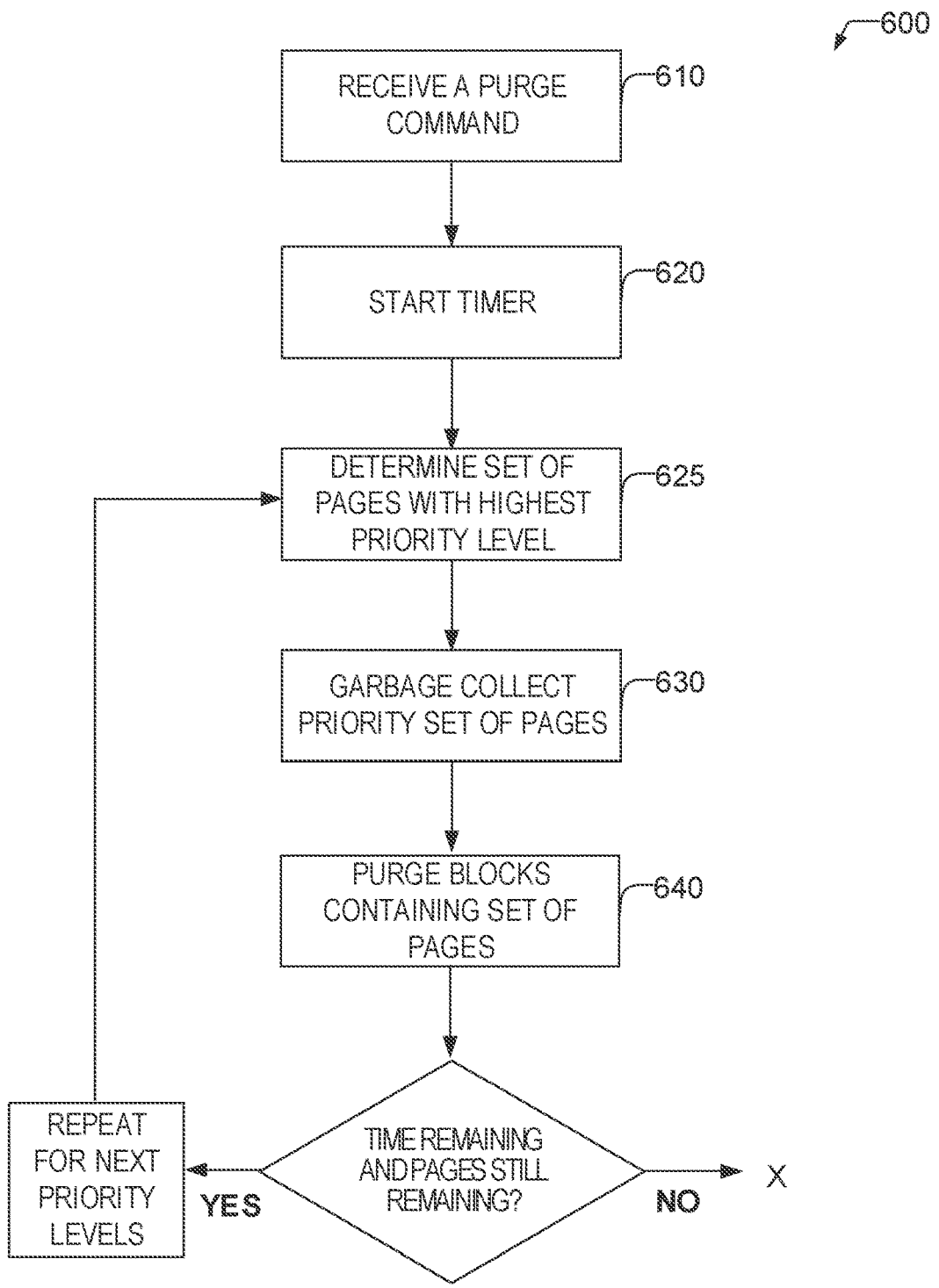
FIG. 6 illustrates a flowchart of a method of purging a NAND device with prioritized pages according to some examples of the present disclosure.

FIG. 6 illustrates a flowchart of a method 600 of purging a NAND device with prioritized pages according to some examples of the present disclosure. Method 600 is an example of method 500. At operation 610 the NAND memory device may receive a purge command. For example, the purge command may be received over an interface such as a UFS interface from a host device. At operation 620 the NAND device may start a timer that may be a requested time for finishing the purge request. The requested time may be specified in the purge request, in a separate message over the communications interface, may be part of the firmware object of the NAND device, and the like.

At operation 625 the NAND memory device may determine a set of pages with a highest priority level. For example, if there is only one priority level, the NAND may determine the set of pages that are marked as a priority (e.g., the pages corresponding to an LBA marked as priority). If there are multiple priority levels, the NAND may first select the highest priority level. Which priority levels are the highest relative to other priority levels may be predefined (e.g., in an interface specification or the like).

At operation 630 the NAND device may garbage collect the blocks that contain those pages such that those pages may be purged. For example, for each particular page in the set of pages determined at operation 625, the system may copy the data in the particular page to a different block and mark the particular page as invalid. At operation 640, the system may then purge all the garbage collected blocks. In some examples, operations 630 and 640 may be performed sequentially for each page—that is, for each particular page, the block may be garbage collected and purged prior to moving onto garbage collection of the next page.

If there is time remaining and there are additional pages to purge, the system may repeat operations 625-640 for the next most important priority level and so on until either there are no pages to purge or the time has expired.

Figure 7:
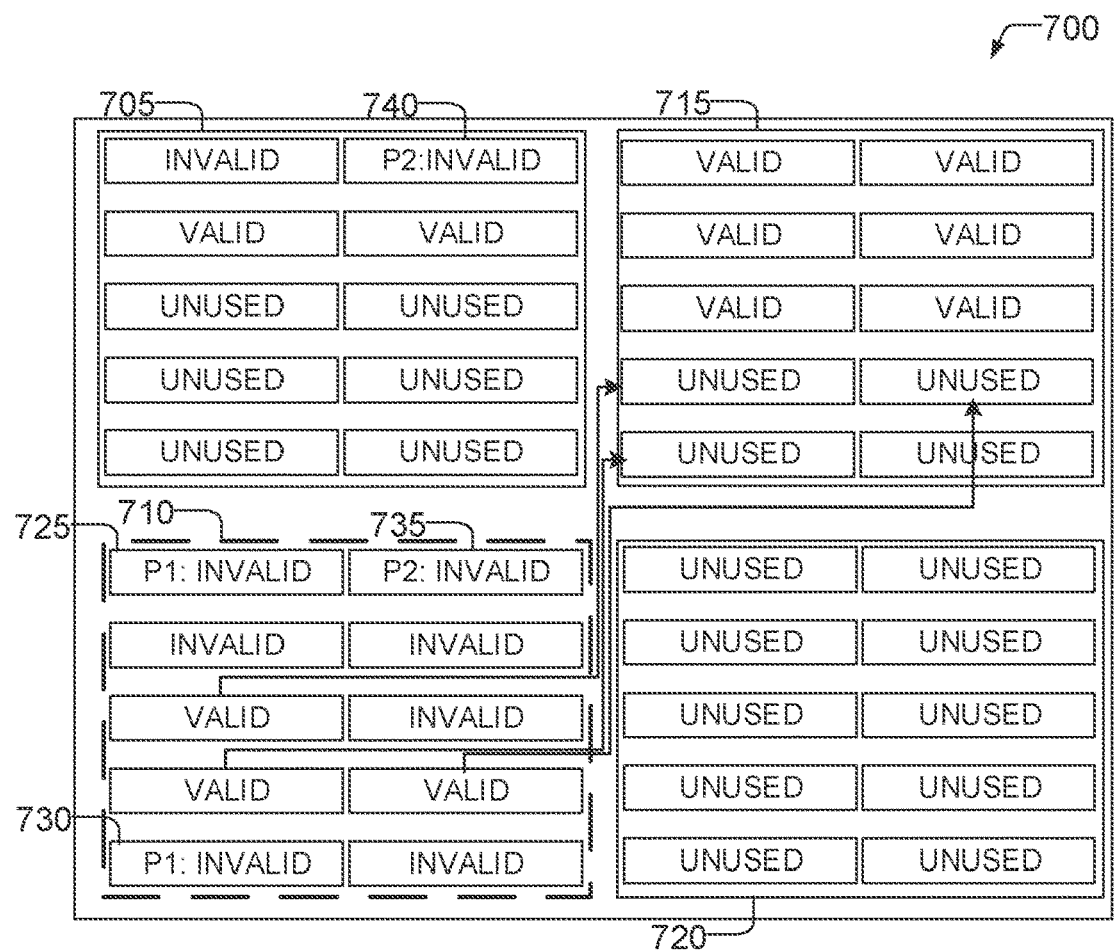
FIG. 7 illustrates an example diagram of a purge with priority from a page and block level according to some examples of the present disclosure.

FIG. 7 illustrates an example diagram 700 of a purge with priority from a page and block level according to some examples of the present disclosure. As shown, blocks 705, 710, 715, and 720 of a NAND contain ten pages each. This is exemplary and more or less pages may be in a particular block. Pages are labelled in FIG. 7 with their status. For example, a page labeled "INVALID" is a page that is invalid and awaiting erasure. This may have occurred, for example, in response to a delete command from the host, a rewrite command, or the like. Pages labeled "VALID" are pages that hold valid values and may be referenced by one or more LBAs. Pages that have a prefix in front of the "INVALID" label indicate a priority value assigned to the page. For example, "P1:INVALID" indicates that this page has a priority value of 1. Pages marked "UNUSED" are pages that do not contain a value and are ready to be written.

In the example of FIG. 7, pages labeled as priority 1 (shown with P1 prefixes—e.g., pages 725 and 730) are given priority in a purge over pages labeled as priority 2 (shown with P2 prefixes—e.g., pages 735 and 740). Priority 2 pages have priority over other invalid pages.

In some examples, a NAND device that does not implement the priority scheme disclosed herein may first garbage collect block 705. If the time limit on the purge is reached prior to garbage collecting block 710, sensitive data that may reside in pages 710, 735, and 730 may not be destroyed. Instead, as disclosed herein, the NAND device may determine that block 710 should be garbage collected first as it contains the highest priority pages 725 and 730. This is despite the fact that block 705 has a priority 2 page 740. A priority 1 page in the example of FIG. 7 is a higher priority so block 710 is garbage collected first. In some examples, to perform the garbage collection, the NAND device may move valid pages in block 710 to unused pages in block 715. The valid pages are then marked as invalid and the entire block 710 may be erased.

The NAND memory device may continue erasing all blocks containing priority 1 pages until the timer expires or until all blocks with priority 1 pages have been erased. If all priority 1 pages have been erased and the timer has not expired, the NAND device may start with other priority levels. For example, the NAND memory device may allow for specifying hierarchies of priority. Thus, priority level 2 may be the next most important priority level. Blocks containing pages marked as priority level 2 (P2) that have not already been erased as part of the erasure of blocks containing P1 pages (e.g., page 735 of FIG. 7) may then be erased. For example, in FIG. 7, page 740. Thus, block 705 may be garbage collected (e.g., by moving valid pages to blocks 715 or 720) and then erased.

Figure 8:
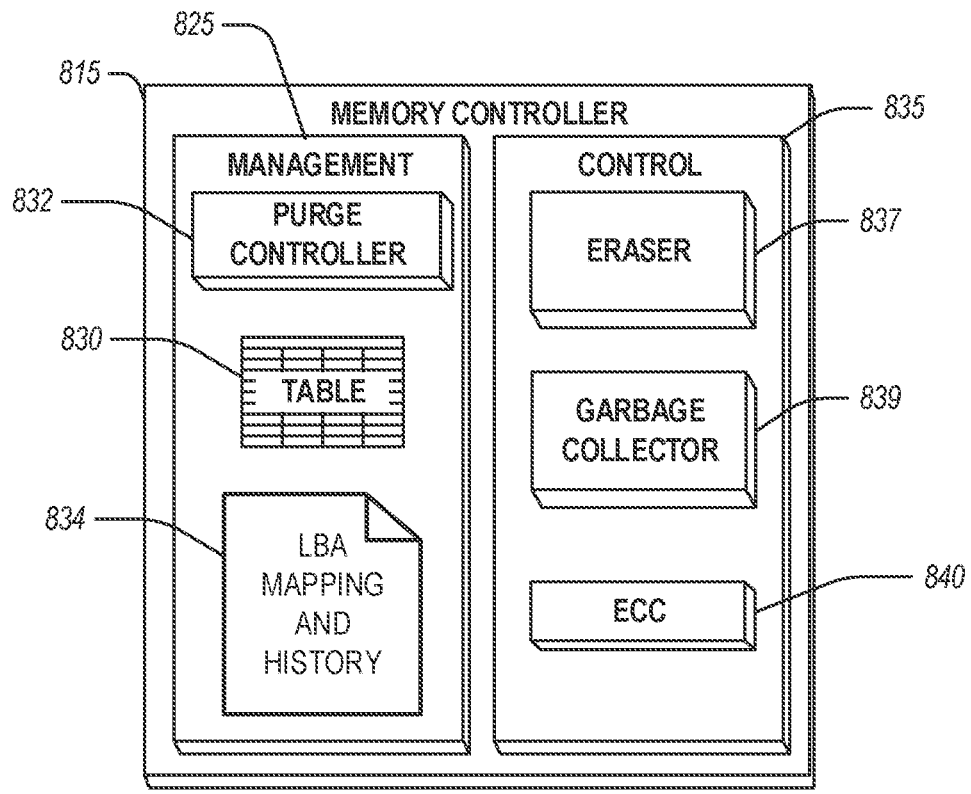
FIG. 8 shows a diagram of a memory controller according to some examples of the present disclosure.

The priority schemes discussed herein may be implemented by the controller 135 or memory manager 125 of FIG. 1. FIG. 8 shows a diagram of a memory controller 815 according to some examples of the present disclosure. Memory controller 815 may be an example of the memory controller 115 in some examples. In some examples, manager 825, controller 835, table 830, and ECC 840 may be embodiments of manager 125, controller 135, table 130, and ECC 140 respectively. Purge controller 832 may process the purge message, store a time limit (timeout value) received from the host (e.g., in table 830), set a timer with the time limit, and determine a first set of pages with the highest priority level. For example, the purge controller 832 may access a data structure 834 that stores an LBA mapping and mapping history that provides the memory cells (e.g., pages) that correspond to a particular LBA. The purge controller then calls a garbage collector 839 to garbage collect the blocks that the pages in the first set are a part of. Once the garbage collector 839 is done, the purge controller may call the eraser 837 to erase the block and prepare it for new data. Purge controller 832 may then purge other pages based upon other priority levels as described in FIG. 6 until a timer expires. Once the timer expires, the purge controller may end the purge operation.

Figure 9:
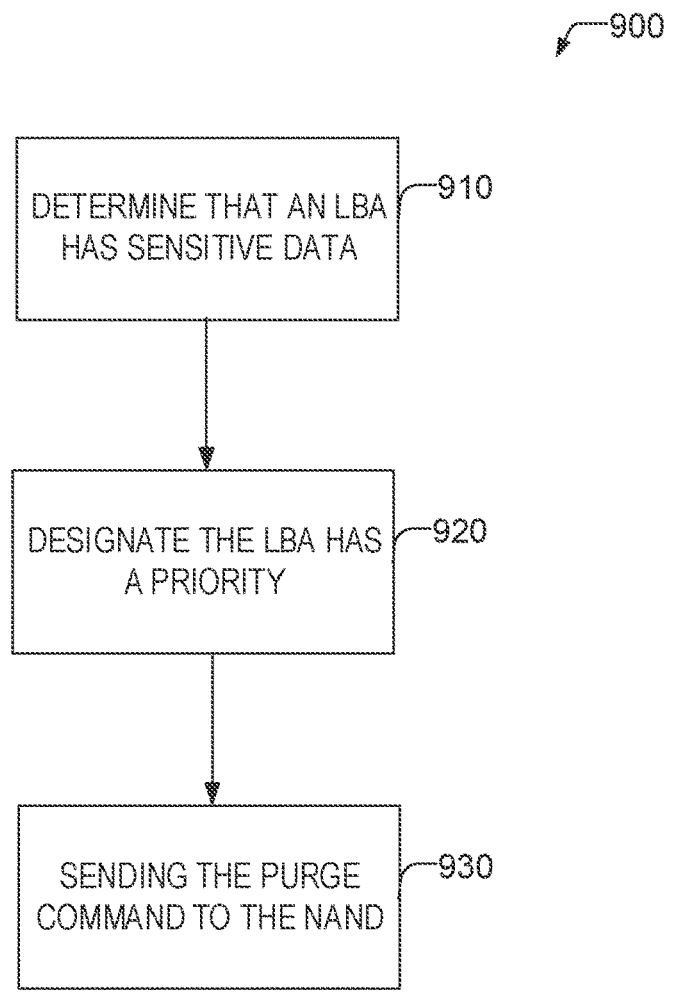
FIG. 9 illustrates a flowchart of a method of a host device instructing the NAND to perform a priority purge according to some examples of the present disclosure.

FIG. 9 illustrates a flowchart of a method 900 of a host device instructing the NAND to perform a priority purge according to some examples of the present disclosure. At operation 910 the host device determines than an LBA has sensitive data. For example, the host device may receive information on which data is sensitive from application layer programs, a predetermined table, a list, or the like. At operation 920 the host may designate the LBA as a priority for purging over one or more other pages. The host may make this designation through setting a field in a write command, a rewrite command, a delete command that is transmitted over a communications interface to the NAND. In other examples, the host may make this designation by setting a field in the purge command. As noted previously, the priority may be binary (either the LBA is a priority or not), or may be one of a plurality of priority levels. At operation 930 the host may send the purge command to the NAND.

Figure 10:
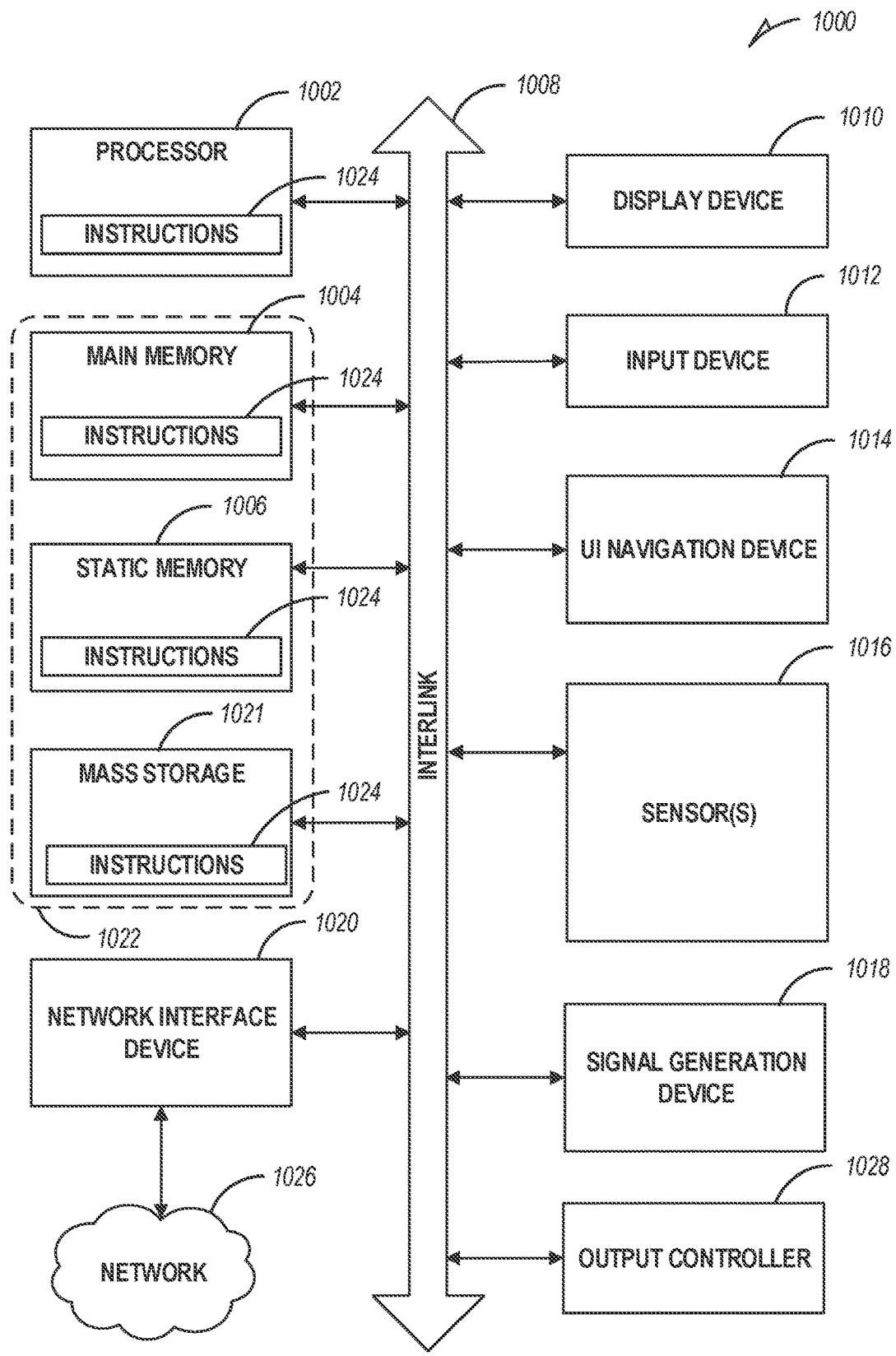
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1000 (e.g., the host device 105, the memory device 110, etc.) may include a hardware processor 1002 (e.g., a central processing unit (CPU), a graphics processing unit (GPU), a hardware processor core, or any combination thereof, such as the memory controller 115, etc.), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute the machine readable medium 1022.

While the machine readable medium 1022 is illustrated as a single medium, the term "machine readable medium" may include a single medium or multiple media (e.g., a centralized or distributed database, or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 (e.g., software, programs, an operating system (OS), etc.) or other data are stored on the storage device 1021, can be accessed by the memory 1004 for use by the processor 1002. The memory 1004 (e.g., DRAM) is typically fast, but volatile, and thus a different type of storage than the storage device 1021 (e.g., an SSD), which is suitable for long-term storage, including while in an "off" condition. The instructions 1024 or data in use by a user or the machine 1000 are typically loaded in the memory 1004 for use by the processor 1002. When the memory 1004 is full, virtual space from the storage device 1021 can be allocated to supplement the memory 1004; however, because the storage 1021 device is typically slower than the memory 1004, and write speeds are typically at least twice as slow as read speeds, use of virtual memory can greatly reduce user experience due to storage device latency (in contrast to the memory 1004, e.g., DRAM). Further, use of the storage device 1021 for virtual memory can greatly reduce the usable lifespan of the storage device 1021.

In contrast to virtual memory, virtual memory compression (e.g., the Linux® kernel feature "ZRAM") uses part of the memory as compressed block storage to avoid paging to the storage device 1021. Paging takes place in the compressed block until it is necessary to write such data to the storage device 1021. Virtual memory compression increases the usable size of memory 1004, while reducing wear on the storage device 1021.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on"(in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a source-side select gate (SGS), a control gate (CG), and a drain-side select gate (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

Other Notes and Examples

Example 1 is a method comprising: receiving a purge command from a host device over a host interface; determining that a first particular page of a first particular block of a NAND memory device is indicated as having priority over a second particular page of the NAND memory device; and in response, purging the NAND memory device such that the first particular page is purged prior to any attempt to purge the second particular page.

In Example 2, the subject matter of Example 1 optionally includes wherein the purge command includes an indication that the first particular page has a priority, and wherein the determining the first particular page has priority comprises identifying the indication in the purge command.

In Example 3, the subject matter of any one or more of Examples 1-2 optionally include wherein determining that the first particular page of the first particular block of a NAND memory device is indicated as having priority over the second particular page of the NAND memory device comprises determining a priority level.

In Example 4, the subject matter of any one or more of Examples 1-3 optionally include wherein a previous command includes an indication that the first particular page has a priority, and wherein the determining the first particular page has priority comprises identifying the indication in a data structure of the NAND.

In Example 5, the subject matter of any one or more of Examples 1-4 optionally include wherein a third particular page of the NAND memory device is indicated as having priority over the first and second particular pages of the NAND memory device; and wherein the method comprises purging the NAND such that the third particular page is purged prior to any attempt to purge the first particular page.

In Example 6, the subject matter of any one or more of Examples 1-5 optionally include wherein purging the NAND such that the first particular page is purged prior to the second particular page comprises: determining that pages other than the first particular page in the first block are valid, and in response, copying the pages in the first particular block that are valid to a second particular block in the NAND, and erasing the first particular block.

In Example 7, the subject matter of any one or more of Examples 1-6 optionally include wherein the purge command includes a time limit, and wherein the purging of the NAND stops upon expiry of the time limit.

In Example 8, the subject matter of any one or more of Examples 1-7 optionally include wherein the method comprises: subsequent to purging the first particular page, storing a value in the first particular page.

Example 9 is a method of purging a NAND memory device comprising: determining that a logical block address (LBA) contains sensitive data; designating the LBA as having a priority greater than another LBA; and in response, sending a purge command over a host interface to a NAND memory device, the NAND memory device purging the LBA prior to an attempt to purge the another LBA.

In Example 10, the subject matter of Example 9 optionally includes wherein the purge command includes a time limit, upon expiry of the time limit the NAND device stops purging.

In Example 11, the subject matter of any one or more of Examples 9-10 optionally include wherein designating the LBA as having the priority greater than the another LBA comprises: identifying the LBA as having the priority in the purge command.

In Example 12, the subject matter of any one or more of Examples 9-11 optionally include wherein designating the LBA as having the priority greater than the another LBA comprises: identifying the LBA as having the priority in a command issued to the NAND prior to the purge command.

In Example 13, the subject matter of any one or more of Examples 9-12 optionally include wherein designating the LBA as having the priority greater than the another LBA comprises: designating the LBA as having a first priority.

In Example 14, the subject matter of Example 13 optionally includes wherein designating the LBA as having the priority greater than the another LBA comprises: designating the another LBA as having a second priority, the second priority of a lower priority than the first priority.

In Example 15, the subject matter of Example 14 optionally includes not designating a third LBA, and wherein the NAND memory device purges the LBA prior to an attempt to purge the another LBA and purges the another LBA prior to an attempt to purge the third LBA.

Example 16 is a machine readable medium comprising instructions, that when executed by the machine, causes the machine to perform operations comprising: receiving a purge command from a host device over a host interface; determining that a first particular page of a first particular block of a NAND memory device is indicated as having priority over a second particular page of the NAND memory device; and in response, purging the NAND memory device such that the first particular page is purged prior to any attempt to purge the second particular page.

In Example 17, the subject matter of Example 16 optionally includes wherein the purge command includes an indication that the first particular page has a priority, and wherein the operations of determining the first particular page has priority comprises the operations of identifying the indication in the purge command.

In Example 18, the subject matter of any one or more of Examples 16-17 optionally include wherein the operations of determining that the first particular page of the first particular block of a NAND machine readable medium is indicated as having priority over the second particular page of the NAND machine readable medium comprises the operations of determining a priority level.

In Example 19, the subject matter of any one or more of Examples 16-18 optionally include wherein a previous command includes an indication that the first particular page has a priority, and wherein the operations of determining the first particular page has priority comprises identifying the indication in a data structure of the NAND.

In Example 20, the subject matter of any one or more of Examples 16-19 optionally include wherein a third particular page of the NAND machine readable medium is indicated as having priority over the first and second particular pages of the NAND machine readable medium; and wherein the operations further comprise purging the NAND such that the third particular page is purged prior to any attempt to purge the first particular page.

In Example 21, the subject matter of any one or more of Examples 16-20 optionally include wherein the operations of purging the NAND such that the first particular page is purged prior to the second particular page comprises the operations of: determining that pages other than the first particular page in the first block are valid, and in response, copying the pages in the first particular block that are valid to a second particular block in the NAND, and erasing the first particular block.

In Example 22, the subject matter of any one or more of Examples 16-21 optionally include wherein the purge command includes a time limit, and wherein the operations of purging of the NAND stops upon expiry of the time limit.

In Example 23, the subject matter of any one or more of Examples 16-22 optionally include wherein the operations further comprise: subsequent to purging the first particular page, storing a value in the first particular page.

Example 24 is a machine readable medium comprising instructions, that when executed by the machine, causes the machine to perform operations comprising: determining that a logical block address (LBA) contains sensitive data; designating the LBA as having a priority greater than another LBA; and in response, sending a purge command over a host interface to a NAND memory device, the NAND host device purging the LBA prior to an attempt to purge the another LBA.

In Example 25, the subject matter of Example 24 optionally includes wherein the purge command includes a time limit, upon expiry of the time limit the NAND device stops purging.

In Example 26, the subject matter of any one or more of Examples 24-25 optionally include wherein the operations of designating the LBA as having the priority greater than the another LBA comprises the operations of: identifying the LBA as having the priority in the purge command.

In Example 27, the subject matter of any one or more of Examples 24-26 optionally include wherein the operations of designating the LBA as having the priority greater than the another LBA comprises the operations of: identifying the LBA as having the priority in a command issued to the NAND prior to the purge command.

In Example 28, the subject matter of any one or more of Examples 24-27 optionally include wherein the operations of designating the LBA as having the priority greater than the another LBA comprises the operations of: designating the LBA as having a first priority.

In Example 29, the subject matter of Example 28 optionally includes wherein the operations of designating the LBA as having the priority greater than the another LBA comprises the operations of: designating the another LBA as having a second priority, the second priority of a lower priority than the first priority.

In Example 30, the subject matter of Example 29 optionally includes wherein the operations further comprise not designating a third LBA, and wherein the NAND machine readable medium purges the LBA prior to an attempt to purge the another LBA and purges the another LBA prior to an attempt to purge the third LBA.

Example 31 is a NAND memory device comprising: a controller configured to perform the operations comprising: receiving a purge command from a host device over a host interface; determining that a first particular page of a first particular block of a NAND memory device is indicated as having priority over a second particular page of the NAND memory device; and in response, purging the NAND memory device such that the first particular page is purged prior to any attempt to purge the second particular page.

In Example 32, the subject matter of Example 31 optionally includes wherein the purge command includes an indication that the first particular page has a priority, and wherein the operations of determining the first particular page has priority comprises the operations of identifying the indication in the purge command.

In Example 33, the subject matter of any one or more of Examples 31-32 optionally include wherein the operations of determining that the first particular page of the first particular block of a NAND memory device is indicated as having priority over the second particular page of the NAND memory device comprises the operations of determining a priority level.

In Example 34, the subject matter of any one or more of Examples 31-33 optionally include wherein a previous command includes an indication that the first particular page has a priority, and wherein the operations of determining the first particular page has priority comprises identifying the indication in a data structure of the NAND.

In Example 35, the subject matter of any one or more of Examples 31-34 optionally include wherein a third particular page of the NAND memory device is indicated as having priority over the first and second particular pages of the NAND memory device; and wherein the operations further comprise purging the NAND such that the third particular page is purged prior to any attempt to purge the first particular page.

In Example 36, the subject matter of any one or more of Examples 31-35 optionally include wherein the operations of purging the NAND such that the first particular page is purged prior to the second particular page comprises the operations of: determining that pages other than the first particular page in the first block are valid, and in response, copying the pages in the first particular block that are valid to a second particular block in the NAND, and erasing the first particular block.

In Example 37, the subject matter of any one or more of Examples 31-36 optionally include wherein the purge command includes a time limit, and wherein the operations of purging of the NAND stops upon expiry of the time limit.

In Example 38, the subject matter of any one or more of Examples 31-37 optionally include wherein the operations further comprise: subsequent to purging the first particular page, storing a value in the first particular page.

Example 39 is a host device comprising: a processor configured to perform operations comprising: determining that a logical block address (LBA) contains sensitive data; designating the LBA as having a priority greater than another LBA; and in response, sending a purge command over a host interface to a NAND memory device, the NAND host device purging the LBA prior to an attempt to purge the another LBA.

In Example 40, the subject matter of Example 39 optionally includes wherein the purge command includes a time limit, upon expiry of the time limit the NAND device stops purging.

In Example 41, the subject matter of any one or more of Examples 39-40 optionally include wherein the operations of designating the LBA as having the priority greater than the another LBA comprises the operations of: identifying the LBA as having the priority in the purge command.

In Example 42, the subject matter of any one or more of Examples 39-41 optionally include wherein the operations of designating the LBA as having the priority greater than the another LBA comprises the operations of: identifying the LBA as having the priority in a command issued to the NAND prior to the purge command.

In Example 43, the subject matter of any one or more of Examples 39-42 optionally include wherein the operations of designating the LBA as having the priority greater than the another LBA comprises the operations of: designating the LBA as having a first priority.

In Example 44, the subject matter of Example 43 optionally includes wherein the operations of designating the LBA as having the priority greater than the another LBA comprises the operations of: designating the another LBA as having a second priority, the second priority of a lower priority than the first priority.

In Example 45, the subject matter of Example 44 optionally includes wherein the operations further comprise not designating a third LBA, and wherein the NAND host device purges the LBA prior to an attempt to purge the another LBA and purges the another LBA prior to an attempt to purge the third LBA.

Example 46 is a device comprising: means for receiving a purge command from a host device over a host interface; means for determining that a first particular page of a first particular block of a NAND memory device is indicated as having priority over a second particular page of the NAND memory device; and in response, means for purging the NAND memory device such that the first particular page is purged prior to any attempt to purge the second particular page.

In Example 47, the subject matter of Example 46 optionally includes wherein the purge command includes an indication that the first particular page has a priority, and wherein the means for determining the first particular page has priority comprises means for identifying the indication in the purge command.

In Example 48, the subject matter of any one or more of Examples 46-47 optionally include wherein the means for determining that the first particular page of the first particular block of a NAND memory device is indicated as having priority over the second particular page of the NAND memory device comprises means for determining a priority level.

In Example 49, the subject matter of any one or more of Examples 46-48 optionally include wherein a previous command includes an indication that the first particular page has a priority, and wherein the means for determining the first particular page has priority comprises means for identifying the indication in a data structure of the NAND.

In Example 50, the subject matter of any one or more of Examples 46-49 optionally include wherein a third particular page of the NAND memory device is indicated as having priority over the first and second particular pages of the NAND memory device; and wherein the device further comprises means for purging the NAND such that the third particular page is purged prior to any attempt to purge the first particular page.

In Example 51, the subject matter of any one or more of Examples 46-50 optionally include wherein the means for purging the NAND such that the first particular page is purged prior to the second particular page comprises: means for determining that pages other than the first particular page in the first block are valid, and in response, means for copying the pages in the first particular block that are valid to a second particular block in the NAND, and means for erasing the first particular block.

In Example 52, the subject matter of any one or more of Examples 46-51 optionally include wherein the purge command includes a time limit, and wherein the means for purging of the NAND stops upon expiry of the time limit.

In Example 53, the subject matter of any one or more of Examples 46-52 optionally include wherein the device comprises: subsequent to purging the first particular page, means for storing a value in the first particular page.

Example 54 is a device comprising: means for determining that a logical block address (LBA) contains sensitive data; means for designating the LBA as having a priority greater than another LBA; and in response, means for sending a purge command over a host interface to a NAND memory device, the NAND memory device purging the LBA prior to an attempt to purge the another LBA.

In Example 55, the subject matter of Example 54 optionally includes wherein the purge command includes a time limit, upon expiry of the time limit the NAND device stops purging.

In Example 56, the subject matter of any one or more of Examples 54-55 optionally include wherein the means for designating the LBA as having the priority greater than the another LBA comprises: means for identifying the LBA as having the priority in the purge command.

In Example 57, the subject matter of any one or more of Examples 54-56 optionally include wherein the means for designating the LBA as having the priority greater than the another LBA comprises: means for identifying the LBA as having the priority in a command issued to the NAND prior to the purge command.

In Example 58, the subject matter of any one or more of Examples 54-57 optionally include wherein the means for designating the LBA as having the priority greater than the another LBA comprises: means for designating the LBA as having a first priority.

In Example 59, the subject matter of Example 58 optionally includes wherein the means for designating the LBA as having the priority greater than the another LBA comprises: means for designating the another LBA as having a second priority, the second priority of a lower priority than the first priority.

In Example 60, the subject matter of Example 59 optionally includes means for not designating a third LBA, and wherein the NAND memory device purges the LBA prior to an attempt to purge the another LBA and purges the another LBA prior to an attempt to purge the third LBA.

The invention claimed is:

1. A memory device comprising:
a memory array;
a hardware processor configured to perform operations comprising:
receiving, from a host device, a command to purge a group of pages of the memory array, the group of pages including at least first, second, and third sets of pages, and wherein the first, second, and third sets of pages each have a respective purge priority set by the host device;
responsive to the command, starting a timer; and
while the timer has not expired:
garbage collecting according to the specified purge priorities, including garbage collecting the first set of pages first, the second set of pages second, and at least one page of the third set of pages of the memory array.

2. The memory device of claim 1, wherein the specified purge priorities are specified by the host device in a previously issued memory device command.

3. The memory device of claim 2, wherein the previously issued memory device command is a write command.

4. The memory device of claim 3, wherein the previously issued memory device command includes a flag indicating that a first page referenced in the previously issued memory device command is in the first set of pages.

5. The memory device of claim 1, wherein the command is sent by the host device and includes a time limit, and wherein the operations of starting the timer comprise setting the timer based upon the time limit.

6. The memory device of claim 1, wherein the operations further comprise receiving a list of logical block address that identifies the first set of pages and the second set of pages.

7. The memory device of claim 1, wherein the operations further comprise identifying the first set of pages based upon a priority coded into a firmware of the memory device.

8. A method comprising:
receiving, from a host device, and at a memory device that includes a memory array, a command to purge a group of pages of the memory array, the group of pages including at least first, second, and third sets of pages, and wherein the first, second, and third sets of pages each have a respective purge priority set by the host device;
responsive to the command, starting a timer; and
while the timer has not expired:
garbage collecting according to the specified purge priorities, including garbage collecting the first set of pages first, the second set of pages second, and at least one page of the third set of pages of the memory array.

9. The method of claim 8, wherein the specified purge priorities are specified by the host device in a previously issued memory device command.

10. The method of claim 9, wherein the previously issued memory device command is a write command.

11. The method of claim 10, wherein the previously issued memory device command includes a flag indicating that a first page referenced in the previously issued memory device command is in the first set of pages.

12. The method of claim 8, wherein the command is sent by the host device and includes a time limit, and wherein starting the timer comprise setting the timer based upon the time limit.

13. The method of claim 8, wherein the method further comprises receiving a list of logical block address that identifies the first set of pages and the second set of pages.

14. The method of claim 8, wherein the method further comprise identifying the first set of pages based upon a priority coded into a firmware of the memory device.

15. A non-transitory machine-readable medium, storing instructions, which when executed by a machine, cause the machine to perform operations comprising:
  receiving, from a host device, a command to purge a group of pages of a memory array of a memory device, the group of pages including at least first, second, and third sets of pages, and wherein the first, second, and third sets of pages each have a respective purge priority set by the host device;
  responsive to the command, starting a timer; and
  while the timer has not expired:
    garbage collecting according to the specified purge priorities, including garbage collecting the first set of pages first, the second set of pages second, and at least one page of the third set of pages of the memory array.

16. The non-transitory machine-readable medium of claim 15, wherein the specified purge priorities are specified by the host device in a previously issued memory device command.

17. The non-transitory machine-readable medium of claim 16, wherein the previously issued memory device command is a write command.

18. The non-transitory machine-readable medium of claim 17, wherein the previously issued memory device command includes a flag indicating that a first page referenced in the previously issued memory device command is in the first set of pages.

19. The non-transitory machine-readable medium of claim 15, wherein the command is sent by the host device and includes a time limit, and wherein the operations of starting the timer comprise setting the timer based upon the time limit.

20. The non-transitory machine-readable medium of claim 15, wherein the operations further comprise receiving a list of logical block address that identifies the first set of pages and the second set of pages.

* * * * *